Figure 1:
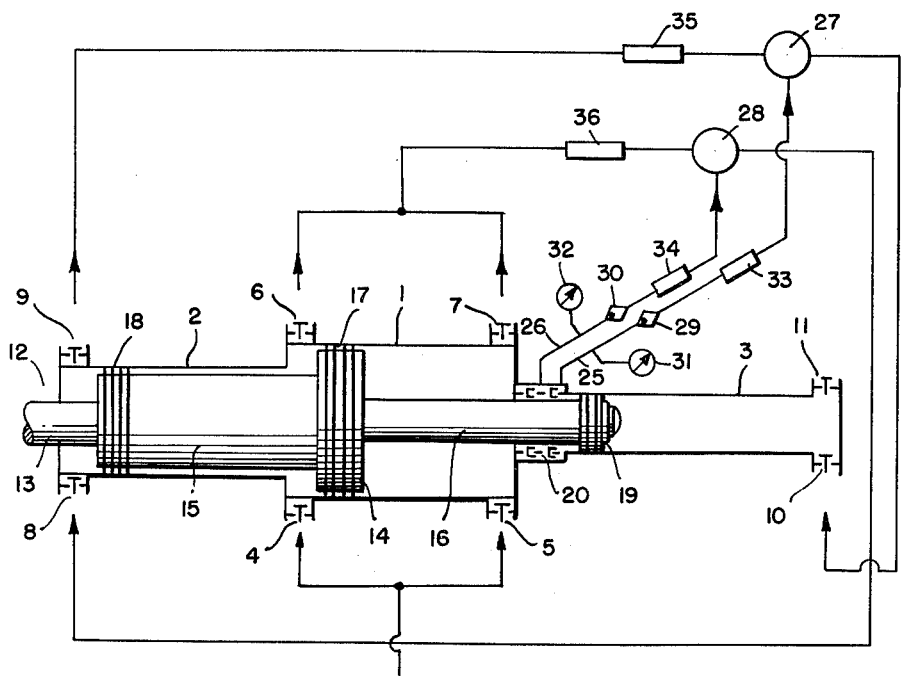

June 22, 1965  H. WEBER ETAL  3,190,545
PISTON SEAL FOR A MULTISTAGE HIGH PRESSURE GAS COMPRESSOR
Filed July 5, 1962  2 Sheets-Sheet 1

INVENTORS:
HEINRICH WEBER
HEINRICH FRIEDENREICH
BY
Marquee Johnston, Cook & Root
ATT'YS June 22, 1965  H. WEBER ETAL  3,190,545
PISTON SEAL FOR A MULTISTAGE HIGH PRESSURE GAS COMPRESSOR
Filed July 5, 1962  2 Sheets-Sheet 2

INVENTORS:
HEINRICH WEBER
HEINRICH FRIEDENREICH
BY
ATT'YS

United States Patent Office 3,190,545
Patented June 22, 1965

3,190,545
PISTON SEAL FOR A MULTISTAGE HIGH
PRESSURE GAS COMPRESSOR
Heinrich Weber, Ludwigshafen (Rhine), and Heinrich
Friedenreich, Limburgerhof, Pfalz, Germany, assignors
to Badische Anilin- & Soda-Fabrik Aktiengesellschaft,
Ludwigshafen (Rhine), Germany
Filed July 5, 1962, Ser. No. 207,608
Claims priority, application Germany, July 5, 1961,
B 63,138
7 Claims. (Cl. 230—183)

This invention relates to piston seals for compressors. More particularly, it relates to seals for pistons and piston rods of a multistage high pressure compressor or for a two-stage after-compressor arranged after a multistage compressor for compressing a gas.

Chemical high pressure syntheses demand the generation of high gas pressures by compressors comprising several stages. For example, six stage compressors followed by after-compressors may be employed.

In such multistage gas compressors several connected cylinders of different diameters may contain a single piston of appropriately stepped diameters.

The provision of reliable seals between piston and cylinder in high pressure compressors of such a kind is a matter of considerable difficulty. The gas leakage depends upon the difference between the pressures on either side of the seal.

The ratio of the delivery pressures from two consecutive stages of multistage compressors generating final pressures up to between 300 and 4000 atmospheres is roughly constant throughout the compression range. This ratio may vary between 2.0 and 3.2, that is to say the pressure in each stage may be 2 to 2.3 times higher than the pressure in the preceding stage. Consequently the pressure differentials between final consecutive stages may be very considerable and these must be separated by the seals. Another factor which accentuates the problem of sealing when the pressure differentials are high is the disposition of the cylinders in relation to each other.

In order to balance the loads on the piston rod and the energy consumed in the reciprocation of stepped pistons the cylinder sequence is not arranged to correspond with the sequence of the pressure stages. Hence, it follows that the piston of the final stage is not sealed against the pressure of the immediately preceding stage, but rather against the pressure of the stage preceding the latter or against the pressure of an even lower compression stage. The pressure ratio acting on opposite sides of the seal may therefore be as high as 4 and 5 to 1. At high pressures the absolute pressure differences may thus be very high. In after-compressors the pressure ratio of the two consecutive final stages may be between 2 and 4 to 1 and in view of the high absolute values of the final pressures attained, which may be as high as 1500 to 4000 atmospheres, the resultant differentials are likewise very high.

It has been the practice in compressors to provide seals on the pistons in the form of piston ring packings. These consist of a plurality of elastic piston rings juxtaposed on the piston periphery. The piston rings are held in spacing and supporting rings and form the seal between the cylinder liner and the running surface of the piston. The number of piston rings and hence the length of the piston ring packing is determined by the pressure gradient which must be sealed and the amount of gas leakage which from experience is considerable allowable.

The coefficients of friction of piston ring packings are low, especially if the rings are metallic, and their resistance to wear is high. They can satisfactorily deal with pressure differentials up to 1000 atmospheres and, besides being of simple construction, they are easily replaceable. However, they have grave drawbacks at high pressures.

The very large number of rings for the sealing of high pressures determines the length of the packing and hence the length of the escape path of particles abraded by wear. It also determines the total amount of space which must be provided for elastic deflection and hence the space in which abraded material can collect. Abraded particles are swept out in the direction of the pressure gradient, i.e. the direction of blow-by, and the material travels along the surface of the cylinder liner. However, part of this dust is also blown into the lateral clearances of the piston rings. Experience has shown that the fracture of rings is generally due to the space provided for elastic deflection having been filled with abraded dust which thus deprives the piston rings of the required mobility.

Another drawback of conventional piston ring packings arises from the high pressure differentials which cyclically affect the piston rings. The pressure differential is responsible for the contact pressures between piston ring, liner and carrier ring. These forces and the coefficient of friction determine the absolute friction on the piston liner and the bearing face of the carrier rings. The work performed by each ring in overcoming friction is proportional to the piston stroke and the elastic deflection and this work is represented by abrasion and wear.

Another drawback of conventional piston ring packings is the loss which arises from the decompression and ejection of the leakage gas to the pressure of a stage which is two or three stages lower or to the gasholder or suction pressure of the machine. A portion of possibly even the whole of the work expended in compressing the leakage gas is thus lost by the subsequent decompression of the leakage gas.

Apart from moving piston ring packings stationary U-ring packings are likewise known which consist of a plurality of channel-section rings located in the casing side by side and forming sealing lips. These U-rings are made of plastic or plastic compositions, based for instance on polyamides, polytetrafluoroethylene or synthetic rubber, and their sliding properties may be improved by known additives.

U-ring packings of the aforesaid kind have hitherto been used in compressors only in exceptional cases. They are more generally employed in piston pumps intended for pumping liquids.

If sufficiently lubricated these U-rings packings form good seals and the volume of leakage gas remains negligibly small for lengthy periods of operation. Moreover, the coefficients of friction of polyamide U-rings are lower than, and those of U-rings of other materials are generally not very different from, the coefficients of friction of good metal seals. For this reason U-ring packings dissipate little frictional energy and wear is therefore low. At constant pressures which may exceed 500 atmospheres, this type of packing has a long life. Since leakage is suppressed up to higher pressures than is the case in piston ring packings the overall loss of compressional work is lower. Another advantage of these packings is their ready exchangeability and their insensitivity to slight changes in the cross sections of plunger or rod. They are not affected by small amounts of dirt and their cost of production and assembly is low.

A major drawback of U-ring packings is that they are not resistant to high temperatures. Polyamide U-rings do not stand up to operational temperatures in excess of 120 to 160°. Moreover, such packings are unable to resist high pressures acting alternately from either side. Alternating pressures can be applied only if these are very low. Finally, the load resisting capacity of U-ring packings is limited because the strength of the plastics from which these U-rings are made by injection molding is only about ⅕ to ⅒ of that of comparable metals.

The chief object of the present invention is therefore to provide a piston seal for a high pressure multistage gas compressor which has suction and pressure pipe connections.

Another object of the invention is to provide a seal for gas compressors generating final pressures up to 4000 atmospheres. Another object of the invention is to reduce the pressures acting on either side of gas compressor seals. Another object of the invention is to reduce the length of the packings and the frictional losses and to prolong the life of the packings.

Figure 2:
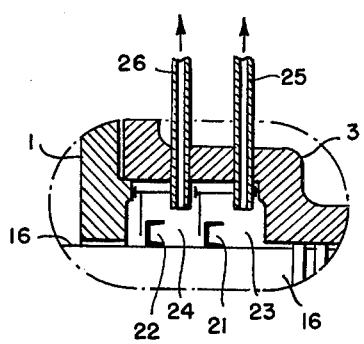
Figure 3:
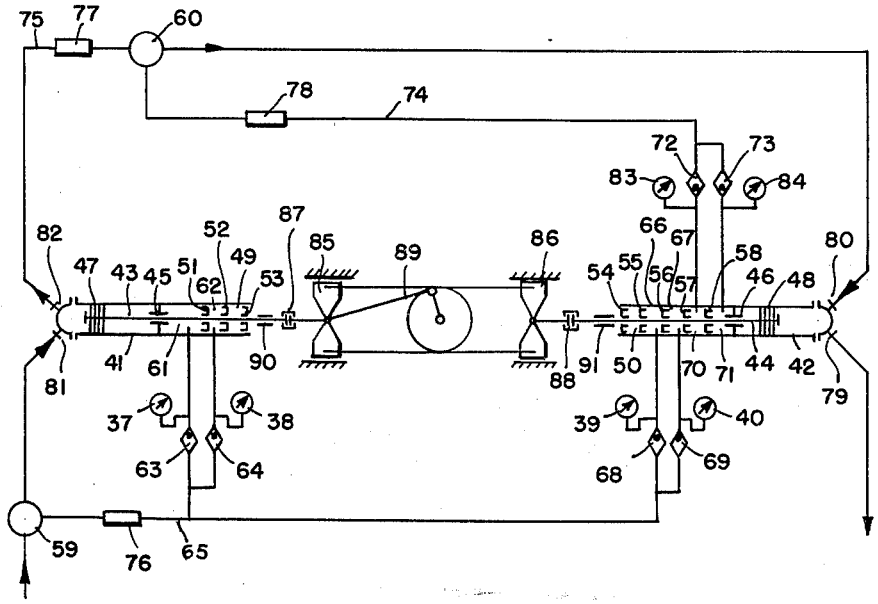

In order that the invention may be more readily understood a number of embodiments and arrangements of packings according to the invention will now be described by reference to the accompanying drawings in which FIG. 1 is an arrangement in a multistage compressor, FIG. 2 is an enlarged detail from FIG. 1, showing a U-ring packing, and FIG. 3 is the arrangement of a packing in a two-stage after-compressor.

The multistage high pressure gas compressor in which sealing means according to the invention are incorporated comprises a casing containing a plurality of cylinders, valves and pipe connections in the cylinder walls and a stepped piston with piston ring packings. The invention consists in the provision of a piston seal consisting of U-rings in the final stage of the compressor, formed by a stationary U-ring packing located in the cylinder wall of the final stage, the space between the piston ring packing on the piston of the final stage and the first adjacent U-ring communicating through a non-return valve, cooling means and an oil trap with the suction pipe of the final stage and the space between the first and second U-ring communicating through a non-return valve, cooling means and an oil trap with the suction pipe of the penultimate stage.

The means according to the invention may also be incorporated in a two-stage high pressure after-compressor comprising two coaxially opposed cylinders with common drive means, valves and pipe connections in the cylinder walls at the relatively remote ends of the cylinders, each cylinder containing a piston provided with a piston seal and reciprocable by common motor drive means. In such a compressor the invention provides a piston seal of U-rings in the first and final stages of the compressor, formed by U-rings packings rigidly arranged in the cylinder wall on the sides opposite the free ends of the first and final stage cylinders, the space in the final stage between the piston ring packing and the first adjacent U-ring as well as between the first and second U-ring communicating with the suction pipe of the final stage through non-return valves, cooling means and an oil trap, and the space between the third and fourth as well as between the fourth and fifth U-ring in the final stage and the space between the piston ring packing and the first U-ring in the penultimate stage communicating with the suction pipe of the penultimate stage through non-return valves, a cooling means and an oil trap. Between the two types of packing, guide bushes for the piston rods are provided.

Owing to its particular construction and disposition the packing according to the present invention combines the advantages of metallic piston ring packings with the advantages afforded by U-ring packings as regards nature and magnitude of load bearing capacity, wear, leakage gas removal and type of material, whereas the drawbacks of these types of packing relating to magnitude of the separated pressure differential, direction of load, wear and leakage gas loss are minimized.

In compressors with a plurality of cylinders of different diameters connected in tandem and containing an appropriately stepped piston the piston ring packing is located on the forward part of the piston in the final stage and the U-ring packing comprising two U-rings is fitted into the associated cylinder wall to form a seal at the rear end of the final stage piston, whereas a pipe connection for leakage gas is provided in the cylinder wall between the piston ring packing and the U-ring packing as well as between the two U-rings, said pipe connections communicating with the suction pipe of the stage.

If a two-stage after-compressor equipped with pistons and rods is used for the two final stages then the spaces between the piston ring packing and the first U-ring and between the first and the second U-ring in the final stage are connected with the suction pipe of the final stage, the spaces between the second and third and between the third and fourth U-ring as well as the spaces between the piston ring packing and the first U-ring and between the first and second U-ring in the penultimate stage being connected with the suction pipe of the penultimate stage.

It will thus be understood that in each of the two compression stages there is provided a piston ring packing on the piston and a U-ring packing in the cylinder containing the piston as well as a bush for guiding the piston rod between the two packings and that there are further provided, in the final stage, in the spaces between the bush and the first U-ring, in the several spaces between the following three U-rings, and in the penultimate stage, in the spaces between the bush and the first U-ring and between the first and second U-ring, outlets for leakage gas, which are connected with the relative suction pipes. Incorporated in the connections between the packing chambers and the suction pipes are non-return valves, oil traps and cooling means. For conducting the gases which have blown by the piston ring packing the piston rod bush is provided with channels. Conveniently the piston rings are made of plastic, such as polyamides or polytetrafluoroethylene. Alternatively only part of the piston rings, namely the sliding surfaces, may be made of a plastic such as polyamide or polyethylene.

For improving the sliding properties the piston rings and U-rings may be made of a self-lubricating sealing material containing, for example, graphite or molybdenum disulfide.

In FIG. 1 the proposed packing is shown as provided in the final stage of a six-stage compressor for compressing a synthesis gas.

The second part of the compressor (the first part containing three stages not being shown in the drawing) comprises a low press cylinder 1, a medium pressure cylinder 2 and a high pressure cylinder 3 (FIG. 1). The cylinders are fitted with suction and delivery valves and, more particularly, the low pressure cylinder has two suction valves 4 and 5 and two delivery valves 6 and 7, the medium pressure cylinder one suction valve 8 and one delivery valve 9 and the high pressure cylinder one suction valve 10 and one delivery valve 11.

The compressor contains a stepped piston 12 which slidably moves in the cylinders of the low medium and high pressure stages. The multistage piston 12 comprises four parts: a piston rod 13, a low pressure piston 14, a medium pressure piston 15 and a high pressure piston 16. Each of the three pistons 14 to 16 is provided with piston ring packings 17 to 19. For balancing the loads on the rod the high pressure cylinder of the high pressure stage is located directly adjacent the low pressure cylinder 1. The high pressure cylinder 3 contains a U-ring packing 20. This consists (FIG. 2) of several, say two U-rings 21 and 22. The packing chambers on the lipped side of the U-rings are connected in the direction of the pressure gradient by pipe lines with oil traps, chamber 23 being thus connected by pipe 25 with an oil trap 27 and chamber 24 by pipe 26 with an oil trap 28.

In order to prevent back flow of leakage gas, pipe 25 contains a non-return valve 29 and similarly pipe 26 contains a non-return valve 30. Pressure gauges 31 and 32 in pipes 25 and 26 indicate the effective pressure.

The object of the pipes 25 and 26 is to provide an outlet for the gases which have passed by the piston ring packing 19 and to limit the pressure gradient between the two U-rings 21 and 22. According to the thermodynamic behavior of the leakage gases, cooling means 33 and 34 are incorporated in pipe lines 25 and 26. Cooling means 35 and 36 are also provided in the pipes between the oil traps 27 and 28 and the delivery valves 6, 7 and 9. The effect of the packing according to the invention will be apparent from a comparison of the pressure differentials obtaining in the presence and in the absence of the U-ring packing 20.

The pressure increment in the last three stages may be as follows:

In the low pressure cylinder 1 from 26 to 75 atm. gauge, in the medium pressure cylinder 2 from 75 to 170 atm. gauge and in the high pressure cylinder from 170 to 320 atm. gauge. In the absence of the proposed U-ring packing 20 the pressure difference which the packing would be called upon to separate would be $170-26=144$ atmospheres during the suction stroke and $325-75=250$ atmospheres during the delivery stroke. Since the pressure in pipe 25 is the pressure of the medium pressure cylinder 2 and that in pipe 26 the pressure obtaining in the low pressure cylinder 1, the pressure differentials are reduced to 0 and 155 atmospheres, respectively.

During the suction stroke the piston ring packing 19 is therefore not subjected to pressure at all, apart from the resistance of the leakage gas and of the gas displaced by the piston, the pressure being equalized through pipe line 25. The relief of the piston ring packing 19 from major pressure has the advantage that lubricant can enter under the permanently and unidirectionally loaded piston rings from the side. Moreover, the low pressure differential permits the number of piston rings and hence the length of the packing 19 to be reduced. More space is thus available for the provision of the U-ring packing.

In the described arrangement the pressure differential acting on U-ring 21 is a constant $170-75=95$ atmospheres and that acting on U-ring 22 is between 0 and 49 atmospheres.

The disposition of the packing according to the invention in an after-compressor is illustrated in FIG. 3. The compressor comprises two cylinders, a medium pressure cylinder 41 and a high pressure cylinder 42, in which piston rods 43 and 44 reciprocate. The gas which is to be compressed reaches the medium pressure cylinder 41 of the after-compressor under pressure from the final stage, that is to say from the high pressure cylinder, of a preceding multistage compressor. The piston rods 43 and 44 are guided centrally in bushes 45 and 46. These guide bushes 45 and 46 are located between piston ring packings 47 and 48 and U-ring packings 49 and 50. Cylinders 41 and 42 are provided with suction valves 80 and 81 and delivery valves 79 and 82.

Suitable channels in the guide bushes permit the pressures to equalize rapidly. The guide bushes are not therefore subjected to a pressure load and they provide an unhindered passage for leakage gas from the piston ring packings to the U-ring packings. The U-ring packing 49 comprises U-rings 51 to 53 and packing 50 comprises U-rings 54 to 58. The packing chambers on the lipped sides of the U-rings are connected by pipe means through non-return valves to the oil traps, the packing chambers 61 and 62 in cylinder 41 being associated with non-return valves 63 and 64, a pipe line 65 and an oil trap 59 and thus connected with the suction valve 81 of the medium pressure cylinder 41. Similarly, the packing chambers 66 and 67 in high pressure cylinder 42 are connected through non-return valves 68 and 69 by pipe line 65 to oil trap 59. Gauges 37 to 40 in the pipe lines indicate the pressure.

The medium pressure stage is preceded by oil trap 59 and followed by oil trap 60. The packing chambers 70 and 71 on the pressure side in cylinder 42 are likewise connected through non-return valves 72 and 73 by pipe 74 to oil trap 60 and thence to the suction valve 80 of the high pressure cylinder 42. Cooling devices 76 to 78 are incorporated in pipe lines 65, 74 and 75. The pistons of the after-compressor are reciprocated by a crank drive 89 and cross-heads 85 and 86, couplings 87 and 88 and piston rods 43 and 44. The latter are guided in external bushes 90 and 91.

The connection of the packing chambers 61, 62, 66, 67, 70 and 71 with the oil traps 59 and 60 has the effect that the leakage gases from both piston packings 47 and 48 are decompressed only to the level of the suction pressure of the stage with which they are associated. Moreover, all the U-rings are subjected only to the constant pressure difference with the preceding stage or to the pressure which arises as the difference between the suction pressure and the pressure in the gasholder.

The arrangement of the packings and the connections established by the pipes, as proposed by the invention, result in the pulsating pressures which fluctuate between the suction and delivery pressures in the cylinder being exclusively borne by the piston ring packings, whereas the gasholder pressure is sealed off by the U-ring packings. The U-rings are exposed only to the pressure gradient determined by the pressure in the stage and the suction pressure preceding the stage.

A comparison of the pressures which the seals must resist in an after-compressor which lacks the U-ring packings with those arising when a U-ring packing is present will reveal that the following conditions apply:

Let it be assumed that the medium pressure cylinder 41 raises the pressure from 220 to 900 atmospheres and the high pressure cylinder 42 from 900 to 1600 atmospheres. If the seal is formed exclusively by piston ring packings, then the packing in the medium pressure cylinder must sustain a pressure differential of $220-0=220$ atmospheres during the suction stroke and of $900-0=900$ during the compression stroke. In the high pressure cylinder the corresponding pressure differentials are 900 and 1600 atmospheres. In a compressor in which U-ring packings are provided as proposed by the present invention, the pressure differentials in the medium pressure cylinder will be 0 and 680 atmospheres for suction and compression stroke, respectively and in the high pressure cylinder 0 and 700 atmospheres, respectively.

The pressure load on the U-rings is always constant since each cylinder must be sealed against the constant pressure in the gasholder, and it amounts to $$900-220=680$$

and $220-0=220$ atmospheres, respectively. In after-compressors the pressure differentials are high than in piston compressors comprising several stages. Therefore several U-rings are provided in each cylinder to prolong the life of the U-ring packings.

The provision of the U-ring packings according to the invention affords the following advantages over the conventional packings:

The pressure differentials across the seals are reduced to about one half during the compression stroke and to zero during the suction stroke.

The number of piston rings can be reduced by about one half.

The length of the piston ring packing is reduced by about one half.

Apart from metallic materials such as bronze, plastics, such as polyamides or polytetrafluoroethylene, of low strength can be used to provide the sliding surfaces in cast iron spring piston rings.

It is thus possible to utilise the low coefficients of friction of polyamides.

Advantages which arise during operation of the arrangement according to the invention are:

The length of the ejection path for abraded particles from the cylinder walls is shorter.

The frictional forces acting on the piston rings are less, in order of magnitude by about one half and in duration restricted to the pressure stroke. Friction is thus reduced, and abrasive wear is lessened. Balanced pressures around the piston rings have the advantage that lubricants can reach the piston ring on all sides. Finally Blow by at the piston ring packing is diminishing (a) In volume by about one half, because the Laval pressure ratio is fully reached only during part of the compression stroke,
(b) In duration to the time of the compression stroke, because a pressure differential cannot build up during the suction stroke.

Other functional advantages of the arrangement according to the present invention are Reduction of the loss of compressional effort expended on the compressed gases and hence improved efficiency. In booster compressors which in the past made use of plungers the annular space represented by the plunger running clearance is eliminated because the plunger becomes a piston. This leads to an improvement in the volumetric efficiency of the machine.

For the U-ring-packing the provision of the preceding piston ring packing and the provision of a communication with an oil trap has the following advantages:

The pressure load is constant and limited by the pressure gradient determined by the compression ratio. Changing pressures of high magnitude which must be sealed do not arise.

Alternating pressures on the seal are only slight in the final stages of multistage compressors.

The preceding piston ring packing intecepts the high temperatures resulting from gas compression.

When gases are compressed to high pressures these advantages lead to a reduction of the loads acting on the packings and to a consequent improvement in their running conditions. As explained, this is achieved by the described arrangement of the two associated packings and by the way in which the packing chambers are connected with the oil traps. The life of the packings is thus prolonged.

We claim:

1. A multistage compressor comprising a high pressure pumping chamber with a piston reciprocable axially therein, piston seal rings slidably contacting the wall of said chamber, a next lower pressure pumping chamber with a piston reciprocable axially therein, valved gas inlet means and valved gas outlet means on each of said pumping chambers, power means mechanically coupled to and reciprocally driving said pistons in opposite phase in the respective pumping chambers, a packing chamber at an axial end of said high pressure pumping chamber, the piston of said high pressure pumping chamber extending axially through said packing chamber, a plurality of U-ring packings fixedly mounted in axially spaced relationship in said packing chamber, the radially inner sides of said U-ring packings being in sealing contact with the last-mentioned piston, pipe means connecting said gas outlet means of said next lower pressure pumping chamber with said gas inlet means of said high pressure pumping chamber, additional pipe means connecting said first-mentioned pipe means and the space axially between said piston seal rings and the U-ring packing axially closest to said high pressure pumping chamber, and a nonreturn valve in said additional pipe means.

2. A multistage compressor as claimed in claim 1 wherein said gas inlet means of said next lower pumping chamber is connected to further pipe means supplying gas under pressure to said next lower pumping chamber, still further pipe means connecting said further pipe means with at least one space between adjacent U-ring packings in said packing chamber, and a nonreturn valve in said still further pipe means.

3. A multistage compressor as claimed in claim 1 wherein means for cooling the gas flowing therethrough is provided in each of said pipe means and said additional pipe means.

4. A multistage compressor as claimed in claim 3, an oil trap in said pipe means, and said additional pipe means being connected to said pipe means via said oil trap.

5. A multistage compressor as claimed in claim 1 wherein said U-ring packings are made from a synthetic, organic polymer.

6. A multistage compressor as claimed in claim 1 wherein the space between the U-ring packing closest to said piston rings and the next adjacent U-ring packing is communicated by pipe means, containing a nonreturn valve, with said additional pipe means.

7. A multistage compressor as claimed in claim 1 wherein said gas inlet means of said next lower pressure pumping chamber has a gas supply pipe connected thereto, the space between the U-ring packing closest to said piston rings and the next adjacent U-ring packing is communicated by pipe means with said gas supply pipe, and a nonreturn valve in said last-mentioned pipe means.

References Cited by the Examiner
UNITED STATES PATENTS

| | | | |
|---|---|---|---|
| 2,143,637 | 1/39 | Vollmann | 230—203 |
| 2,175,868 | 10/39 | Bentley | 277—3 |
| 2,204,374 | 6/40 | Metzgan | 230—203 X |
| 2,928,685 | 3/60 | Tracy | 277—3 |

FOREIGN PATENTS

| | | |
|---|---|---|
| 510,587 | 9/20 | France. |
| 471,951 | 2/29 | Germany. |
| 608,976 | 2/35 | Germany. |
| 1,019,432 | 11/57 | Germany. |

LAURENCE V. EFNER, *Primary Examiner.*

UNITED STATES PATENT OFFICE
CERTIFICATE OF CORRECTION

Patent No. 3,190,545 June 22, 1965

Heinrich Weber et al.

It is hereby certified that error appears in the above numbered patent requiring correction and that the said Letters Patent should read as corrected below.

Column 1, line 67, for "considerable" read -- considered --; column 2, line 34, for "of", second occurrence, read -- or --; column 6, line 43, strike out "cylinder"; column 8, line 50, for "Metzgan" read -- Metzgar --.

Signed and sealed this 23rd day of November 1965.

(SEAL)
Attest:

ERNEST W. SWIDER
Attesting Officer

EDWARD J. BRENNER
Commissioner of Patents